United States Patent Office 2,831,879
Patented Apr. 22, 1958

2,831,879

CHEMICAL PRODUCT AND PROCESS

Viktor Weinmayr, Landenberg, Pa., assignor to E. I. du Pont de Nemours and Company, Wilmington, Del., a corporation of Delaware No Drawing. Application October 27, 1953
Serial No. 388,703

4 Claims. (Cl. 260—439)

This invention relates to the new compound cyclopentadienyl(cyclopentenylcyclopentadienyl)iron and to a process for its manufacture.

Until recently, no compounds were known in which iron is attached directly to a hydrocarbon radical. Dicyclopentadienyliron, the first such compound to be discovered, was described by Kealy and Pauson in Nature 168, 1039 (1951), and claimed by Pauson in U. S. patent application Serial No. 291,567, filed June 5, 1952, now U. S. Patent 2,680,756. Various derivatives of dicyclopentadienyliron such as the alkyl-substituted products disclosed and claimed in Graham et al. U. S. application Serial No. 352,294, filed April 30, 1953, have since been described but there have not been known heretofore any unsaturated cycloalkyl derivatives of this compound.

There has now been discovered the compound cyclopentadienyl(cyclopentenylcyclopentadienyl)iron which is a bright yellow crystalline material, melting when pure at 64–65° C. It is insoluble in water but is soluble in the common organic solvents such as benzene, alcohol, ether, gasoline and the like. It dissolves in 96% sulfuric acid to give a red-brown solution which presumably contains an oxidized form of the iron compound.

Cyclopentadienyl(cyclopentenylcyclopentadienyl)iron is believed to have the following structural formula:

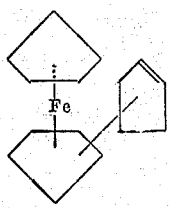

It may also be referred to as monocyclopentenyl dicyclopentadienyliron.

X-ray diffraction studies reported by Dunitz and Orgel in Nature 171, 121 (1953), indicate that dicyclopentadienyliron has a sandwich type structure in which the apices of the pentagons do not coincide. According to Wilkinson et al. in J. Am. Chem. Soc. 74, 2125 (1952), all five positions in each of the cyclopentadienyl rings are equivalent, so that no isomerism with respect to these rings is possible with mono-substituted derivatives.

Cyclopentadienyl(cyclopentenylcyclopentadienyl)iron is made by heating dicyclopentadienyliron with hydrofluoric acid, which evidently produces a molecular rearrangement to form the desired derivative. The hydrofluoric acid should be of at least 45% concentration and may be anhydrous. Temperatures of from 30 to 100° C. may be used, the preferred range being from 85 to 100° C.

After the heating step to form the cyclopentenyl derivative, the reaction mixture is cooled and the product isolated by conventional means. In one method of separation, the reaction mixture is poured onto ice in order to dilute the excess hydrofluoric acid, the product is extracted with an organic solvent such as benzene, and is finally isolated by distillation. The product may then be recrystallized from 95% ethanol. Alternatively, excess hydrofluoric acid can be stripped from the reaction vessel and the product obtained directly by distillation.

Solutions of hydrofluoric acid containing less than 45% hydrofluoric acid do not give satisfactory yields of cyclopentadienyl(cyclopentenylcyclopentadienyl) - iron. Yields are improved as the acid concentration is increased, most satisfactory results being obtained with anhydrous hydrogen fluoride. Use of the anhydrous acid is more economical than use of aqueous solutions, so long as the excess is recovered and reused. It is necessary that the quality of the hydrofluoric acid be high. If appreciable amounts of sulfur dioxide or other sulfur-containing products are present, by-products are produced which are difficult to separate from the desired organo-iron compound because of the excessive foaming which they produce during distillation. Hydrogen fluoride of satisfactory quality is readily prepared by treating technical grade hydrofluoric acid with manganese dioxide according to the process of my pending application Serial No. 236,684, filed July 13, 1951.

Cyclopentadienyl (cyclopentenylcyclopentadienyl) iron may be prepared using phosphoric acid in place of hydrofluoric acid, but the yield and quality of the product obtained are poor. When sulfuric acid is used, the dicyclopentadienyliron is converted to an oxidized form and the cyclopentenyl derivative is not formed. With hydrochloric acid, the iron compound is destroyed at the higher temperatures, while no reaction at all occurs at the lower temperatures.

The reaction is carried out at a temperature of from 30 to 100° C., preferably from 85 to 100° C. The rate of reaction below 30° C. is impractically low. At 100° C., reaction is believed to be complete in an hour or less. Higher temperatures are operable but are unnecessary. The reaction is ordinarily carried out in a closed pressure vessel.

Cyclopentadienyl(cyclopentenylcyclopentadienyl)iron is useful in improving the combustion characteristics of fuel oils, as disclosed in Pedersen U. S. application Serial No. 370,286, filed July 27, 1953. It is also a valuable intermediate in the preparation of other organo-iron compounds. Upon hydrogenation, the double bond in the cyclopentenyl radical becomes saturated and cyclopentadienyl(cyclopentylcyclopentadienyl)iron is obtained. This compound is also a useful fuel additive. The cyclopentenyl derivative may be copolymerized with other olefins to yield products containing iron. A pale yellow product melting at 80° C. is formed when it is heated together with maleic anhydride.

The product of this invention and methods of preparing and using it are illustrated in the following examples, in which parts are by weight:

EXAMPLE 1

A steel pressure vessel is charged with 300 parts of dicyclopentadienyliron. The air in the vessel is displaced with nitrogen and 1200 parts of technical anhydrous hydrogen fluoride containing less than 0.2% sulfur dioxide are distilled into the reactor while agitating and cooling.

The temperature is raised to 100° C. over a period of three hours and the charge is agitated at 100° C. for six hours longer. The reaction mass is cooled to room temperature and discharged onto about 11,000 parts of ice and water. The yellow precipitate which forms is filtered, washed with water to remove most of the dilute hydrofluoric acid, and dissolved in about 880 parts of benzene. The benzene solution is dried with calcium chloride, clarified, and distilled.

Most of the benzene is distilled off by heating the solution until the temperature of the charge is 200° C. and finally heating to 190° C. at a pressure of 10 mm. The reaction product distills from 175–185° C. at a pressure of 12 mm. while the temperature of the contents of the distilling flask is 190–238° C.

One hundred sixty-seven (167) parts of distillate are obtained. The distillation residue weighs 82 parts and contains 15.4% Fe, 75.4% C and 7.1% H.

The yellow distillate, which melts at 60–65° C. is crystallized from 1200 parts of 95% ethyl alcohol. One hundred thirty (130) parts of cyclopentadienyl(cyclopentenylcyclopentadienyl)iron are obtained. The product consists of bright yellow crystals melting at 64–65° C.

*Analysis.*—Calc'd. for $C_{15}H_{16}Fe$: C, 71.4; H, 6.34; Fe, 22.2; M. W., 252. Found: C, 71.6; H, 6.36; Fe, 22.1; M. W. 245 (in benzene).

The product dissolves in 96% sulfuric acid with a red-brown color. The crystals are stable indefinitely. Benzene and alcohol solutions of them show no changes after many weeks storage.

EXAMPLE 2

A steel pressure vessel is charged with 15 parts of manganese dioxide and 800 parts of anhydrous hydrogen fluoride of a technical grade containing 1–2% sulfur dioxide. The temperature of the charge is raised to 80–85° C. over a period of two hours, and then kept at 80–95° C. for two hours. This procedure removes the undesirable sulfur impurities.

After cooling to below 20° C. (the boiling point of hydrogen fluoride) 200 parts of dicyclopentadienyliron (M. P. 174° C.) are added. The temperature of the charge is raised to 100° C. in three hours and agitation at 100° C. is continued for six hours. The reaction mass is then cooled to 10–20° C. and discharged onto about 8000 parts of ice and water. The yellow precipitate is filtered, dissolved in benzene, and distilled as described in Example 1. One hundred twenty (120) parts of cyclopentadienyl(cyclopentenylcyclopentadienyl)iron are thus obtained, which is identical with the product of the preceding example.

EXAMPLE 3

A platinum-lined autoclave is charged with 50 parts of dicyclopentadienyliron and 250 parts of 48% hydrofluoric acid. The air is replaced by nitrogen and the temperature of the charge is raised to 100° C. in three hours and maintained at 100° C. with agitation for six hours.

Upon dilution, filtering and drying as described in the previous examples, 50 parts of crude product are obtained, consisting of coarse yellow crystals and some low melting products. The coarse crystals are unreacted dicyclopentadienyliron. When the low melting material is distilled, cyclopentadienyl(cyclopentenylcyclopentadienyl)iron is obtained in fair yield.

EXAMPLE 4

*Hydrogenation of cyclopentadienyl(cyclopentenylcyclopentadienyl)iron*

Cyclopentadienyl(cyclopentenylcyclopentadienyl)iron is readily hydrogenated to cyclopentadienyl(cyclopentylcyclopentadienyl)iron using platinum oxide as a catalyst and methanol as the solvent. The cyclopentadienyl(cyclopentylcyclopentadienyl)iron is obtained in better than 75% yield. It distills at 160–165° C./10 mm. and has a freezing point of 15–16° C.

*Analysis.*—Calc'd. for $C_{15}H_{18}Fe$: C, 70.9; H, 7.09; Fe, 22.05. Found: C, 71.2; H, 7.07; Fe, 22.0.

EXAMPLE 5

*Reaction with maleic anhydride*

Five parts of cyclopentadienyl(cyclopentenylcyclopentadienyl)iron, 4.6 parts of maleic anhydride, and 90 parts of thiophene-free benzene as solvent are heated to 150° C. for six hours. The cooled reaction mass is clarified from a small amount of impurities and heated on the steam bath with dilute ammonia. The ammonia-insoluble part (3.4 parts) is crystallized from methanol and identified as unreacted starting material.

The ammonia solution is acidified cold with hydrochloric acid and 1.3 parts of a grey solid are obtained. The product is once more dissolved in ammonia and precipitated with hydrochloric acid. It is then dissolved in 10 parts of chloroform and precipitated with 200 parts of petroleum ether. A pale yellow solid (0.9 part) is obtained which melts with decomposition near 80° C.

*Analysis.*—Calc'd. for $C_{19}H_{20}FeO_4$: C, 61.9; H, 5.44; Fe, 15.20. Found: C, 62.3; H, 5.54; Fe, 14.77.

What is claimed is:

1. Cyclopentadienyl(cyclopentenylcyclopentadienyl)iron.

2. A process of preparing cyclopentadienyl(cyclopentenylcyclopentadienyl)iron which comprises heating dicyclopentadienyliron with hydrofluoric acid of at least 45% concentration at a temperature of from 30 to 100° C.

3. A process according to claim 2 in which the reaction is carried out at a temperature between 85 and 100° C.

4. A process of preparing cyclopentadienyl(cyclopentenylcyclopentadienyl)iron which comprises heating dicyclopentadienyliron with anhydrous hydrogen fluoride under pressure at a temperature of from 30 to 100° C.

References Cited in the file of this patent

UNITED STATES PATENTS 2,683,157    Weinmayr _____ July 6, 1954

OTHER REFERENCES

Kealy et al.: Nature, vol. 168 (1951), p. 1039.
Woodward et al.: J. Am. Chem. Soc., vol. 74, pp. 3458–3459, July 1952.